US008217294B2

(12) United States Patent
Zimmermann

(10) Patent No.: US 8,217,294 B2
(45) Date of Patent: Jul. 10, 2012

(54) METHOD AND DEVICE FOR SORTING FLAT MAIL ITEMS

(75) Inventor: Armin Zimmermann, Constance (DE)

(73) Assignee: Siemens Aktiengesellschaft, Munich (DE)

(*) Notice: Subject to any disclaimer, the term of this patent is extended or adjusted under 35 U.S.C. 154(b) by 597 days.

(21) Appl. No.: 12/329,204

(22) Filed: Dec. 5, 2008

(65) Prior Publication Data

US 2009/0145817 A1 Jun. 11, 2009

(30) Foreign Application Priority Data

Dec. 5, 2007 (DE) ......................... 10 2007 058 580

(51) Int. Cl.
*G06K 9/00* (2006.01)

(52) U.S. Cl. ......................... 209/584; 209/583; 209/900

(58) Field of Classification Search .................. 209/583, 209/584, 900
See application file for complete search history.

(56) References Cited

U.S. PATENT DOCUMENTS

| | | | | |
|---|---|---|---|---|
| 5,901,855 | A * | 5/1999 | Uno et al. | 209/584 |
| 5,981,891 | A | 11/1999 | Yamashita et al. | |
| 6,279,750 | B1 | 8/2001 | Lohmann | |
| 6,566,620 | B1 | 5/2003 | Lohmann | |
| 6,598,748 | B2 * | 7/2003 | Mileaf et al. | 209/542 |
| 6,943,312 | B2 | 9/2005 | Zimmermann | |
| 7,414,218 | B2 * | 8/2008 | Wheeler et al. | 209/584 |
| 7,671,293 | B2 * | 3/2010 | Fry et al. | 209/584 |
| 2005/0218046 | A1 | 10/2005 | Mileaf et al. | |
| 2006/0037888 | A1 * | 2/2006 | Wheeler et al. | 209/12.1 |
| 2009/0050541 | A1 * | 2/2009 | Berdelle-Hilge | 209/584 |

FOREIGN PATENT DOCUMENTS

| | | | |
|---|---|---|---|
| DE | 19709232 | A1 | 11/1997 |
| DE | 19629125 | A1 | 1/1998 |
| DE | 19714184 | C2 | 10/1998 |
| DE | 10039419 | C1 | 10/2001 |
| DE | 102007019948 | A1 | 10/2008 |
| EP | 0870551 | A2 | 10/1998 |
| EP | 1961493 | A1 | 8/2008 |
| WO | 03015938 | A1 | 2/2003 |

OTHER PUBLICATIONS

German Office Action dated Jan. 4, 2010.

* cited by examiner

*Primary Examiner* — Terrell Matthews
(74) *Attorney, Agent, or Firm* — Laurence A. Greenberg; Werner H. Stemer; Ralph E. Locher

(57) ABSTRACT

A method is specified for sorting flat mail items, which allows sorting according to delivery order to be carried out swiftly and reliably. With the method a first sorting pass is carried out in a first segment with at least N storage modules of a sorting device and a second sorting pass is then carried out in a second segment with at least N storage modules of the sorting device. The overflow items, which are assigned to a storage module that has been closed because it is full, are deposited into one of the other storage modules in the first sorting pass and are included in the sorting process of the second sorting pass.

2 Claims, 9 Drawing Sheets

40
42
44
56
52
54b
54a
50
58
46a
46b
46c
46d
46e
46f
46g
46h
46i
46j
46k
48a
48b
48c
48d
48e
48f
48g
48h
48i
48j
48k
xx0
xx1
xx2
xx3
xx4
xx5
xx6
xx7
xx8
xx9
xx5

METHOD AND DEVICE FOR SORTING FLAT MAIL ITEMS

CROSS-REFERENCE TO RELATED APPLICATION

This application claims the priority, under 35 U.S.C. §119, of German application DE 10 2007 058 580.4, filed Dec. 5, 2007; the prior application is herewith incorporated by reference in its entirety.

BACKGROUND OF THE INVENTION

Field of the Invention

The invention relates to a method for sorting flat mail items.

Flat mail items, such as letters, large-format letters, postcards, shrink-wrapped newspapers and so on, are sorted in very large numbers by address and deposited in a plurality of stacking compartments in mail centers or large post offices. The degree of sorting that can be achieved is determined by the number of sorting passes and the number of stacking compartments, to which the mail items are distributed, in each sorting pass. In particular the sorting of mail items according to the order of the round of one or more delivery operators is a process, in which a number of sorting runs generally have to be executed due to the plurality of addresses. After the last sorting run the mail items are then present in the sequence in which the delivery operators distribute the mail items to the addressees.

SUMMARY OF THE INVENTION

It is accordingly an object of the invention to provide a method and a device for sorting flat mail items which overcome the above-mentioned disadvantages of the prior art methods and devices of this general type, with which sorting according to round order can be carried out swiftly and reliably.

According to the invention the object is achieved by a method for sorting flat mail items with a sorting device with at least a first and second segment, each with at least N storage modules. A first sorting pass is carried out in the first segment and a subsequent second sorting pass is carried out in the second segment. All overflow mail items, which are assigned to a storage module that is closed because it is full, are deposited in one of the other storage modules in the first sorting pass and are included in the sorting process of the second sorting pass. The sorting device with at least two segments allows sorting according to round order to be carried out swiftly. Depositing the overflow mail items in the further storage module allows the reserve volume in the storage modules to be kept small and therefore a large number of mail items can be sorted simultaneously. Including the overflow mail items in the sorting process, expediently controlled by a process device, allows the number of sorting errors to be kept low.

Sorting is expediently performed according to round order. Sorting according to round order can be implemented by putting a plurality of mail items an indiscriminate sequence into a predetermined sequence. The predetermined sequence can be a function of the mailing destinations of the mail items, for example their delivery addresses. A sorting pass can be understood to be a sorting operation, in which a plurality of mail items are distributed to storage modules as a function of their mailing destinations. In a subsequent sorting pass these already presorted mail items—in some instances minus mail items that have been removed—can be sorted more specifically and to this end can be sorted into the storage modules of the second segment, similarly as a function of their mailing destinations. Sorting according to round order for maximum $N^n$ addresses is possible as a function of the number N of storage modules in each segment and the number n of sorting passes.

The mail items can be mailings of all types for mail dispatch, whose length and thickness respectively is significantly greater than their thickness, e.g. by at least the factor 10. The storage modules are configured to hold a plurality of mail items, expediently at least ten, in particular at least 50, which can be stored in the storage module, in particular stacked one on top of another. The storage modules are advantageously last-in-first-out modules, in other words storage modules in which the last stored mail item of a plurality of mail items is removed, in other words discharged, from the storage module again first. It is possible to store and remove a large number of mail items quickly, reliably and economically.

A storage module that is closed because it is full can be understood to be one which is identified by a process device for controlling sorting in such a manner that no further mail items are to be inserted into the storage module because it is sufficiently full. The identifier can be an electronic signal. Overflow mail items can be those mail items, which would have been deposited in the closed storage module, if it had not been closed. Depositing can take place by stacking. Inclusion in the sorting process of the second sorting pass can be effected by separating a mail item out from a storage module and inserting it into the sorting process of the second sorting pass.

In one advantageous embodiment of the invention the mail items are examined to determine a mailing destination before sorting and mail items that are not recognized during the examination are deposited in a storage module provided for this purpose, with the overflow mail items being deposited in the same storage module. Unrecognized mail items can be separated and grouped with very little outlay, so they can be presented to a mail operator as a set. The storage module provided for this purpose is advantageously a storage module of the first segment. The mailing destination can be a delivery address.

If a second recognition attempt is carried out on previously unrecognized mail items before the second sorting pass, it is possible to achieve a high recognition rate. The mail items newly recognized in the second recognition attempt can be inserted into the storage module assigned to the recognized mailing destination and can then be sorted specifically in the next sorting pass.

Mail item collisions can be avoided, if the overflow mail items and in particular also the unrecognized mail items are switched to a storage module of the second segment before the recognition attempt. Also mail items that are still not recognized can be deposited into the storage module of the first segment provided for this purpose.

The overflow mail items can be included in the sorting process swiftly and with little outlay, if they are included in the sorting process immediately before or after the closed storage module is emptied.

Unrecognized mail items can simply be kept separate when they are deposited in a storage module of the second segment. The storage module of the second segment is expediently provided as an overflow module.

In a further embodiment of the invention the overflow mail items are deposited in a storage module of the second segment in the first sorting pass. There is no need for a separate storage module for overflow mail items.

Between the first and second sorting passes the overflow mail items are advantageously deposited as secondary mail items in at least one partially occupied storage module of the first segment. It is thus possible to dispense with a separate storage module for overflow mail items in the second segment too. The storage module, which is thus occupied in a secondary manner, therefore first accommodates mail items originally assigned to it and sorted into it and then overflow mail items.

The storage module, which is occupied in a secondary manner with overflow mail items, is advantageously a storage module, which is provided for emptying after the closed storage module in the second sorting pass. Blocking of the storage module occupied in a secondary manner with overflow mail items can be avoided by emptying the storage modules of the first segment in the second sorting pass.

In a further variant of the invention the storage module, which is emptied last in the first sorting pass, is allocated a smaller destination area than the previous one, in particular than all the previous ones, before the first sorting pass. It is thus possible to prevent the last storage module overflowing and the overflow mail items being unable to be sorted into a subsequent storage module. The destination area can determine a statistical mail item set into the storage module and is for example a postcode or a number of addresses.

In another variant of the invention the overflow mail items are deposited during the first sorting pass in at least one partially occupied storage module of the first segments as secondary mail items. This allows sorting according to round order to be carried out particularly swiftly.

Mail items, which are originally assigned to the storage module occupied in a secondary manner after secondary occupation, are advantageously deposited in at least one further storage module of the first segment as secondary mail items. It is thus possible to avoid mixing mail items, which are assigned to different storage modules. Since at the point when a compartment overflows, there is generally only a small proportion of mail items still to be sorted, these also only include a few mail items, which are intended for the storage module which has in the meantime also been filled with mail items from the overflowing storage module. If so, these mail items are expediently routed in turn into a storage module, from which mail items are separated after the storage module in question in the next sorting pass. This continually reduces the probability of mail items still arriving, which are assigned to the last storage module in question. If there are not sufficient downstream storage modules for the next sorting pass, a storage module of the second or another segment can be used before the last storage module is reached.

To prevent blocking when the storage modules are being emptied in the next sorting pass, the storage module occupied in a secondary manner is expediently a storage module which is provided for emptying after the closed storage module in the second sorting pass. The emptying operation is expediently a complete emptying operation. The further storage module occupied in a secondary manner is advantageously provided for emptying after the first storage module occupied in a secondary manner.

Sorting can continue in a reliable manner despite the overflow, if in the case of a storage module containing overflow mail items, the overflow mail items are emptied first from the storage module, then another storage module is emptied and then the first storage module is emptied completely.

The invention is also directed at a device for sorting flat mail items. It is proposed that the device contains a sorting device, which has at least a first and second segment, each with at least N storage modules, and also a process device, which is provided to control a first sorting pass in the first segment and a subsequent second sorting pass in the second segment, with the process device also being provided to control the depositing of overflow mail items, which are assigned to a storage module that is closed because it is full, in one of the other storage modules in the first sorting pass and the subsequent inclusion of the overflow mail items in the sorting process of the second sorting pass.

All the control steps also required in respect of further described details of the invention can be initiated by the process device, which is then correspondingly prepared.

The device advantageously contains a circulating conveyor to transport the mail items from one segment to the other segment. The mail items can be transported reliably and swiftly from one segment to the other.

Other features which are considered as characteristic for the invention are set forth in the appended claims.

Although the invention is illustrated and described herein as embodied in a method and a device for sorting flat mail items, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
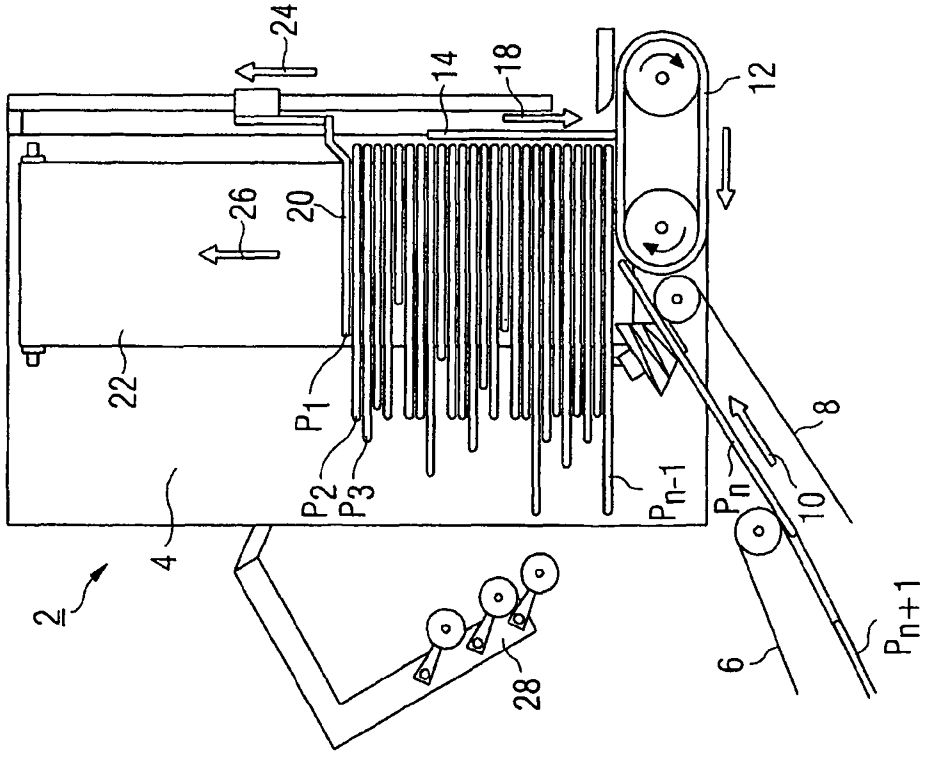
FIG. 1 is a diagrammatic, top view of a storage module in an insertion mode according to the invention.

Referring now to the figures of the drawing in detail and first, particularly, to FIG. 1 thereof, there is shown a schematic diagram of a top view of a storage module 2, operating in insertion mode in the diagram shown in FIG. 1. The storage module 2 is a last-in-first-out module, in which the last inserted mail item is removed first. It contains a storage region 4, in which mail items $P_1, P_2, P_3, \ldots P_{n-1}$ are currently stored. In the diagram shown the mail item $P_n$ will be the next mail item to be transferred into the storage region 4. It is fed between two feed belts 6, 8 to the storage module 2 in a conveyance direction 10 and then taken up by a moving belt 12. The moving belt 12 is hereby driven in a controlled manner and conveys the mail items $P_1, P_2, \ldots P_{n-1}$ to a feed stop 14, which causes the front and lower edges of the mail items $P_1, P_2, P_3, \ldots P_{n-1}$ to be present in a precisely defined position in the storage region 4. In the position shown in FIG. 1 the feed stop 14 also blocks a withdrawal opening 16, which—as shown by an arrow 18—is positioned immediately in front of the moving belt 12.

It is expedient for the mail items $P_1, P_2, P_3, \ldots P_n$ if they are brought into contact with the moving belt 12 with a certain feed pressure. To set the feed pressure a parting blade 20 and a subsurface conveyor belt 22 are provided, which can be moved in a manner that can be regulated very precisely in the stacking direction—in other words the direction in which the stack grows in the storage region 4—according to the arrows 24, 26, when the storage module 2 is in insertion mode. The parting blade 20 is used to generate the feed pressure on the moving belt 12 antiparallel to the stacking direction.

Figure 2:
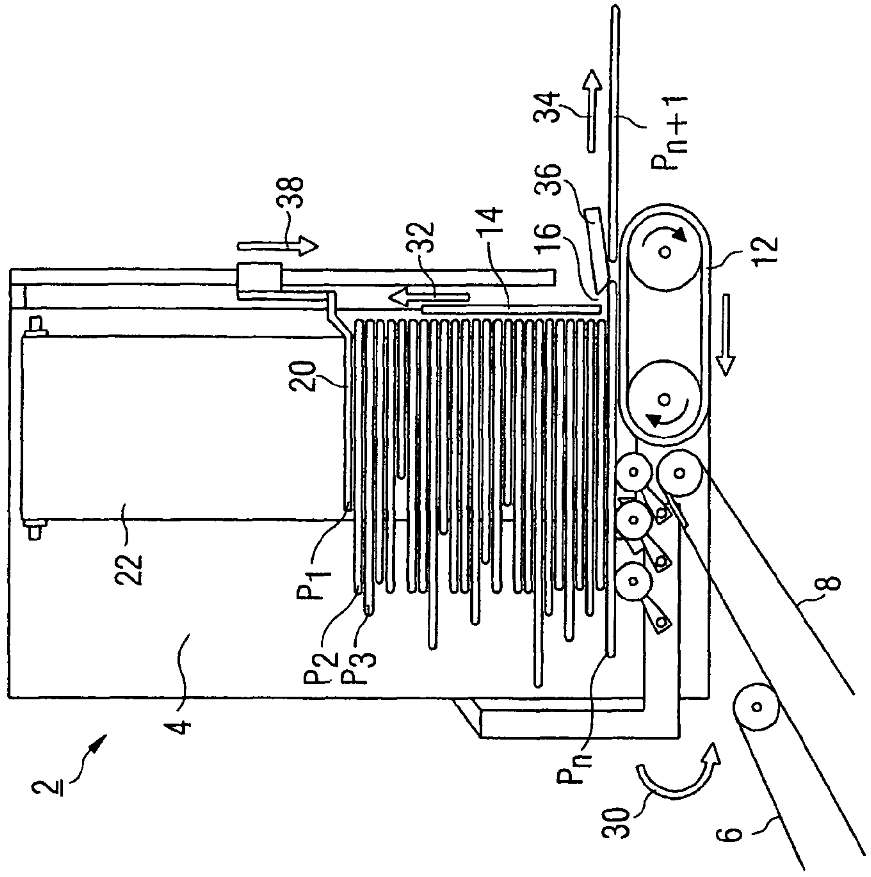
FIG. 2 is a diagrammatic, top view of the storage module in a withdrawal mode.

The storage module 2 also has a support roller arrangement 28, which is swung back into an inactive state in the insertion mode shown in FIG. 1, and which can be swung into its activate state in a swing direction 30 (FIG. 2).

FIG. 2 shows the storage module 2 in its withdrawal mode. The support roller arrangement 28 is in the engaged, active state and ensures that the next mail item $P_n$ to be withdrawn is oriented in a plane, which corresponds essentially to the plane spanned by the moving belt 12 and in proximity to the storage module 2 to the further conveyance direction. In withdrawal mode according to arrow 32 the feed stop 14 is moving upward, thus releasing the withdrawal opening 16. The snapshot shown in FIG. 2 shows the mail item $P_{n+1}$, which has already been fully withdrawn and is conveyed further in a withdrawal direction 34, and the mail item $P_n$, whose front edge is just passing through the withdrawal opening 16 and is kept in contact with the moving belt 12 by a pusher 36. The pusher 36 here helps to prevent double withdrawals, as its friction coefficient is tailored to the friction torque acting on the moving belt 12 and holds back the mail item that is not in direct contact with the moving belt 12 when there is a double withdrawal. The parting blade 20 sets a withdrawal pressure, shown by the arrow 38.

In order to be able to ensure that the at least largely vertical orientation of the mail items stored in the storage region 4 is reliably maintained even as the storage module 2 continues to be emptied, the subsurface conveyor belt 22 is driven as shown by an arrow, thereby displacing the mail items stored in the storage region 4 in conjunction with the pretensioned parting blade 20.

Figure 3:
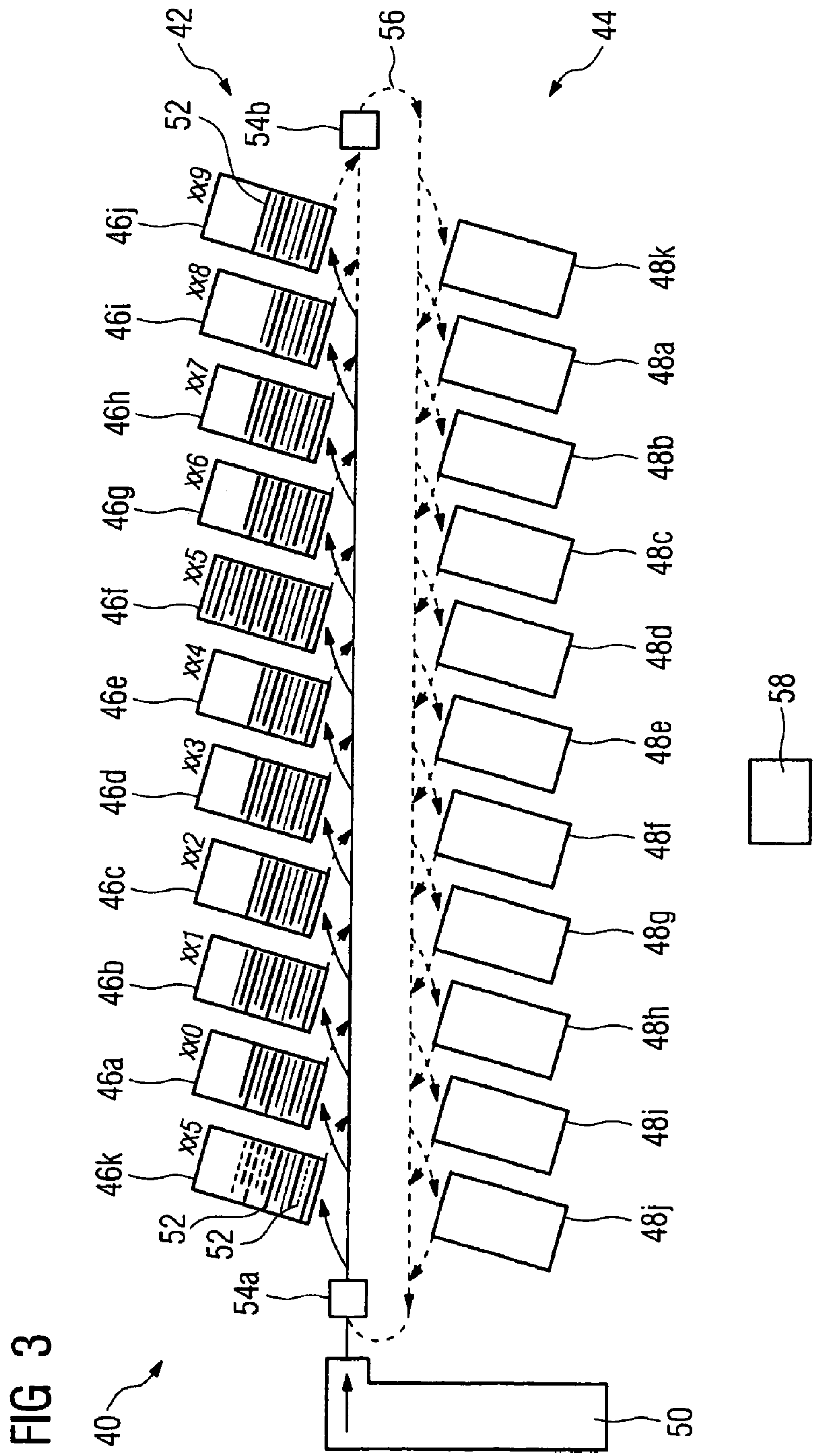
FIG. 3 is an illustration of a device for sorting flat objects with two segments, each with eleven storage modules.

FIG. 3 shows a schematic diagram of a device 40 for sorting flat mail items with two segments 42, 44, each with M=11 storage modules 46*a*-46*k*, 48*a*-48*k*, a separating device 50 for separating mail items 52, a reading device 54 for reading delivery addresses of the mail items 52 and a transport device 56 for transporting the mail items 52 from the separating device 50 to the storage modules 46*a*-48*k*. The device 40 is set up to carry out sorting according to round order and contains a process device 58 (only shown schematically) to control the sorting methods executed by the device 40. The storage modules 46*a*-48*k* are those as described in relation to FIGS. 1 and 2. The separating device 50 serves to transfer mail items 52 from a stack into a flow of mail items, in which the separated mail items 52 are transported at regular intervals. The transport device 56 is a circulating conveyor, which transports the mail items in the mail item flow into the storage modules 46*a-k*, from there into the storage modules 48*a-k* and back to the storage modules 46*a-k*.

In the exemplary embodiment shown in FIG. 3 a plurality of mail items 52 are to be sorted into the round order (delivery route order) of a delivery operator. The delivery addresses of the mail items 52 are distributed arbitrarily in an n-dimensional address space of $N^n$ addresses, it being possible for one delivery address to contain a number of addresses and optionally also vice versa. In this exemplary embodiment let N=10=M−1 and n=3, where n is the number of sorting passes. Both N and n can also be different. The sequence of mail items 52 to be established by sorting according to round order is determined precisely by delivery address and therefore address, with the sequence of mail items 52 sharing the same address being arbitrary.

After separation the mail items 52 are fed to the circulating conveyor and pass the read device 54*a*, which captures the delivery addresses of the mail items 52 optically and forwards corresponding data to the process device 58. An assignment of delivery addresses to addresses is stored in the process device, so that every mail item can be assigned an address in the address space, in other words for example a number from 1 to $N^n$. The addresses are n-digit numbers xxx where $0 \leqq x \leqq N-1$. The mail items 52 are now assigned respectively to one of the N right-hand storage modules 46*a-j* according to the last digit of their address, with the left-hand storage module 46*k* serving as an overflow module and remaining free of mail items 52 at first.

It can happen that the process device 58 cannot determine a delivery address from the data transmitted by the read device 54 and the corresponding mail item 52 can then not be assigned an address and therefore a storage module 46*a-j*. These mail items 52 are then assigned to the storage module 46*k*. In FIG. 3 these mail items 52 are shown with a broken line. The mail items 52 are now transported by the circulating conveyor to the corresponding storage modules 46*a-k* and stored therein according to their assignment to the storage modules 46*a-k*.

The number of mail items 52 sorted in the sorting according to round order operation is determined from the outset in such a manner that it is less than the storage capacity of all the storage modules 46*a-k* put together. If the mail items 52 were distributed uniformly to the $N^n$ addresses, the storage modules 46*a-j* would be uniformly occupied, e.g. up to 80%, so that 20% serves as reserve for non-uniform distribution. If the non-uniform distribution is greater, at some point one of the storage modules 46*a-j* is filled to such a degree that it is marked as closed by the process device 58. The marking can be an electronic identifier in the process device 58. The degree of fill of the storage modules 46*a-j* can be captured by corresponding sensors for determining the degree of fill or by the process device 58 alone, which estimates the degree of fill of a storage module 46*a-j* based on the mail items 52 stored in it.

In the exemplary embodiment shown in FIG. 3 there is an unequal number of mail items 52 with delivery addresses, to which an address with a 5 as the last digit is assigned, so the storage module 46*f* overflows during the first sorting pass and is identified accordingly by the process device 58 at this point.

From this point mail items 52 with an address having a 5 as the last digit are allocated to the storage module 46*k* and deposited there. Unidentified mail items 52 also continue to be deposited in this overflow module, as shown by the bottom mail item 52 shown with a broken line in FIG. 3. At the end of the first sorting pass the mail items 52 are therefore sorted, as shown in FIG. 3.

It is now possible to examine the unrecognized mail items 52 again to determine whether they can be identified before the second sorting pass. To this end the mail items 52 are moved from the overflow module into a storage module 48*a-k* of the second segment 44, for example into the storage module 48*k*, so that mail items 52 can be withdrawn from the storage module 48*k* and others can be stored again in the storage module 46*k* at the same time.

The mail items 52 are then transferred by the circulating conveyor from the second segment 44 back to the first segment 42 and pass the read device 54*a* on the way to the first segment 42. Hitherto unrecognized mail items 52 with sufficiently legible delivery addresses are then deposited according to their delivery address or address in storage modules 46*a-j* and mail items 52 that still cannot be read and overflow mail items are stored in the storage module 46*k* again.

Figure 4:
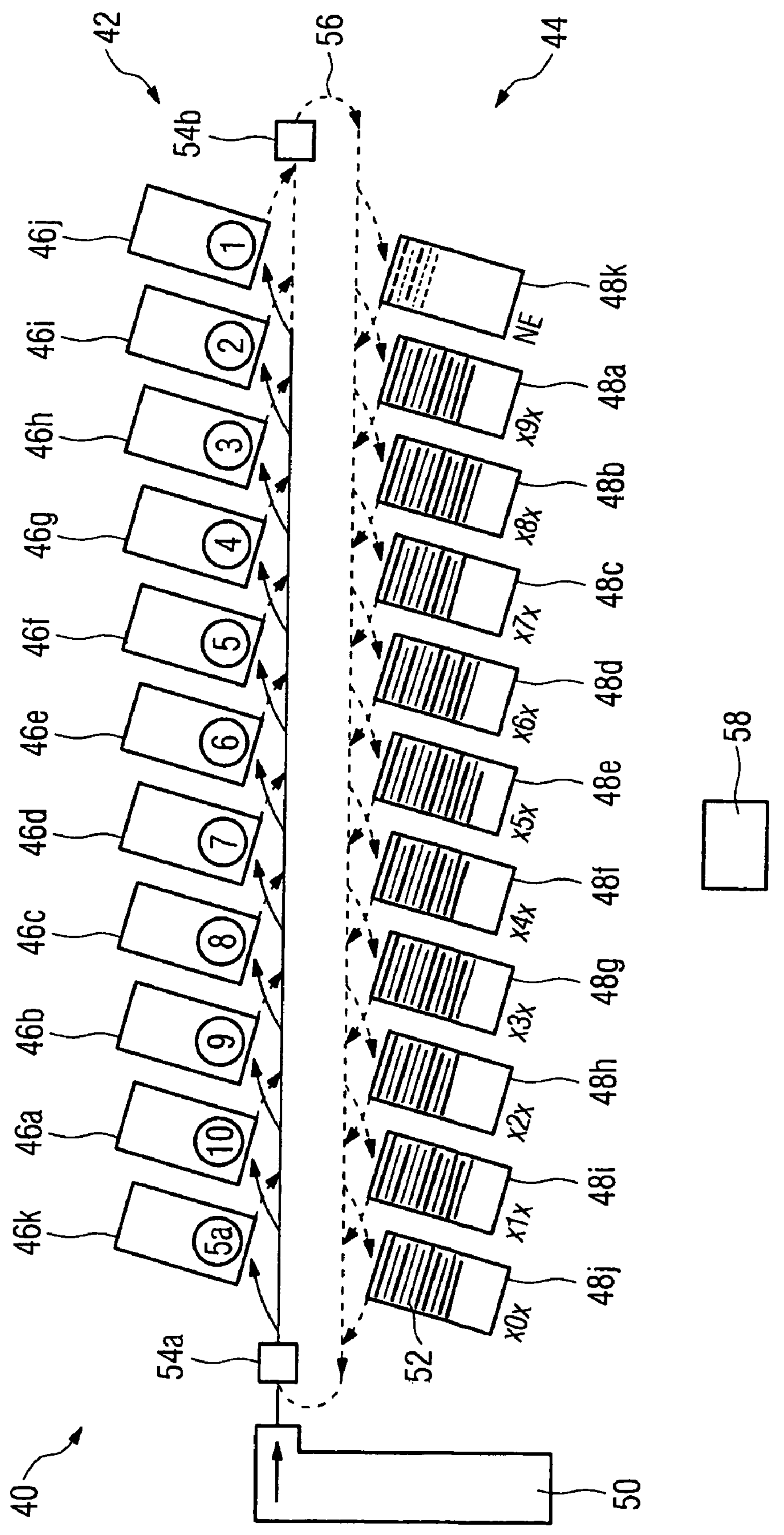
FIG. 4 is an illustration of the device from FIG. 3, in which mail items from the first segment have been sorted into the second segment.

The subsequent second sorting pass is described with reference to the diagram in FIG. 4. The storage module 46*j* is emptied first and its mail items 52 are transported in a uniform flow of mail items by the circulating conveyor into the second segment 44. On the way there they pass a second read device 54*b* to recognize their delivery addresses. In the second segment 44 they are deposited in the corresponding storage modules 48*a-j* according to the second digit of their addresses. Then the storage modules 46*i*, 46*h*, etc. are emptied in order and moved accordingly, until the overflowing storage module 46*f* has been emptied. As soon as this has been emptied, the overflow module 46*k* is emptied, so that the mail items 52 with a 5 as the last digit of their addresses are sorted one after the other into the second segment 44. The unrecognized mail items 52 are stored in the storage module 48*k*, which can also serve as an overflow module, if one of the storage modules 48*a-j* overflows.

The third sorting pass is then executed in the same manner as the second, with the mail items 52 being sorted into the first segment 42 based on the first digit of their addresses. The mail items 52 can now be removed in order from the storage modules 46*a-j* and are then present in the required order. The unidentified mail items 52 are separated in this process and can be collected first and sorted manually into the others by the delivery operator.

Figure 5:
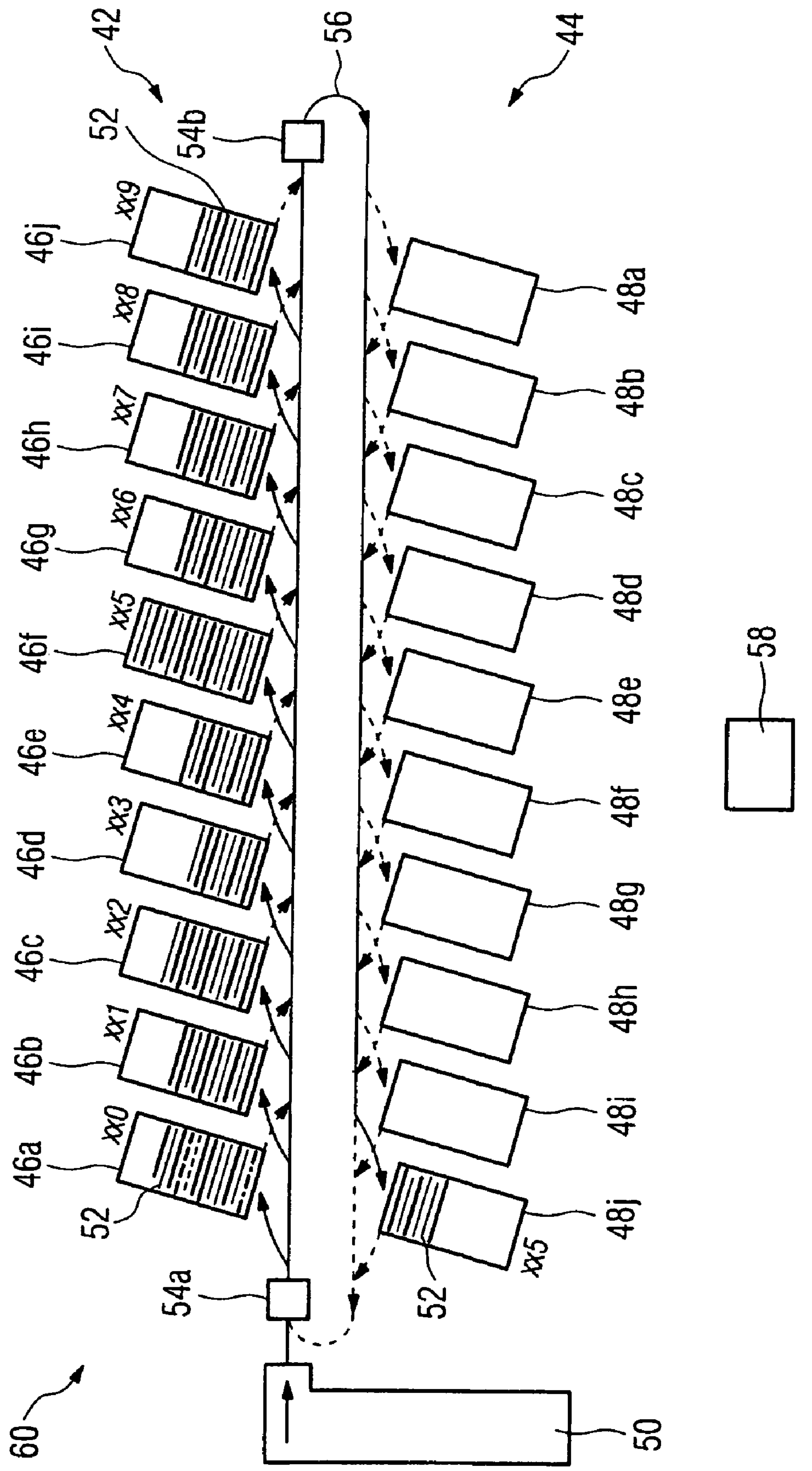
FIG. 5 is an illustration of a further device for sorting flat objects with two segments, each with ten storage modules.

FIG. 5 shows another device 60 for sorting flat mail items 52. The description which follows is restricted essentially to the differences compared with the exemplary embodiment in FIGS. 3 and 4, to which reference is made in respect of features and functions that remain identical. Essentially identical components are basically assigned the same reference characters.

The device 60 contains two segments 42, 44, each with just N=10=M storage modules 46*a*-48*j*, there being no separate overflow module present. Mail items 52 with insufficiently readable delivery addresses are assigned the address 000, so that they are stacked into the storage module 46*a*, as shown by the broken lines. In the example shown in FIG. 5 the storage module 46*f* overflows again. The overflow mail items are now stored in a storage module 48*a-j* of the second segment 44, e.g. in the storage module 48*j*. A separator card 62 with the address 000 is sorted as the last "quasi mail item".

Figure 6:
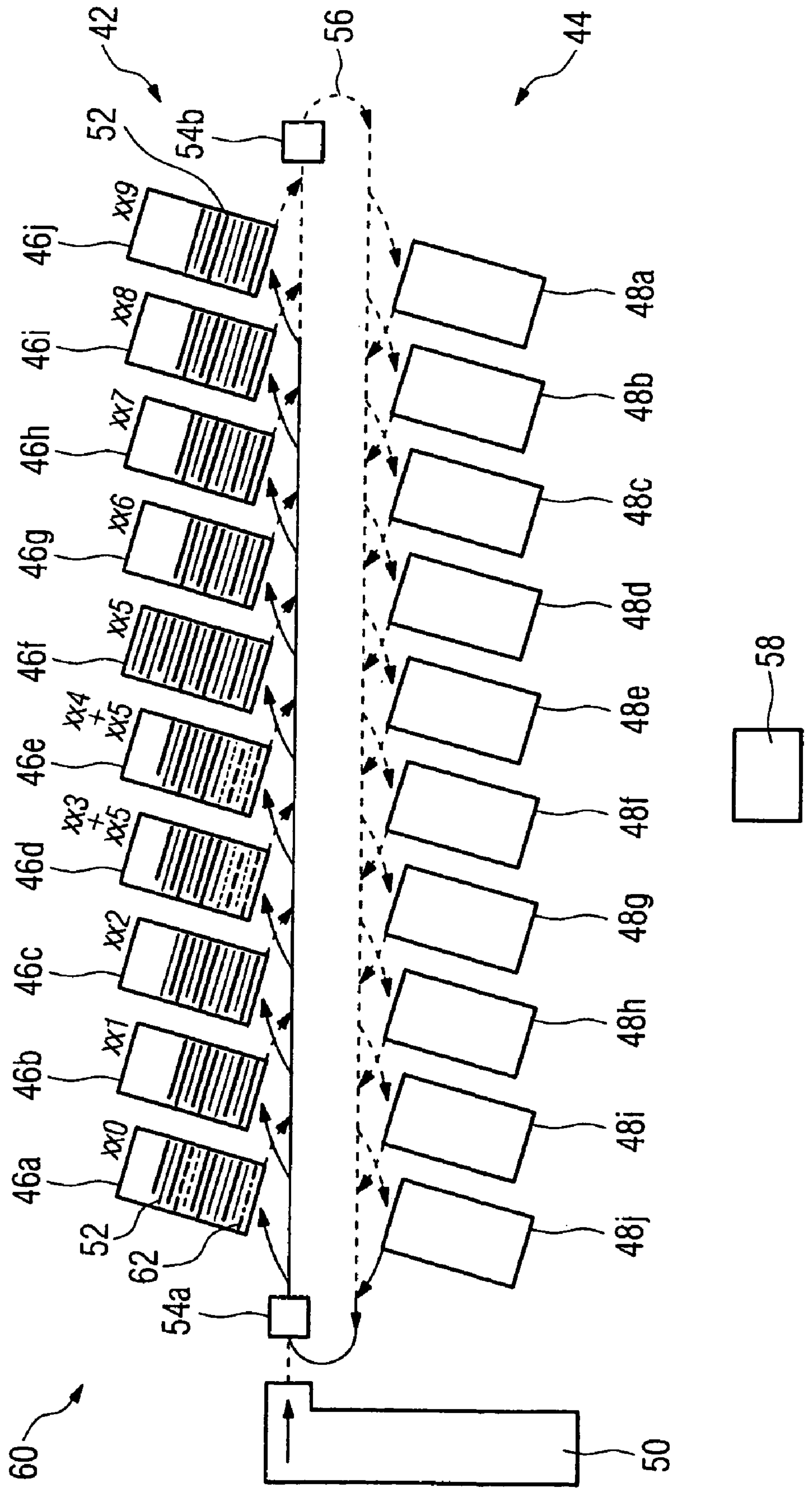
FIG. 6 is an illustration of the device from FIG. 5, in which overflow mail items from a storage module of the second segment have been sorted into the first segment.

FIG. 6 shows how the overflow mail items are now inserted between the first and second sorting passes into those storage modules 46*a-e* that still have sufficient storage space, e.g. into the storage modules 46*d* and 46*e*, as shown by broken lines in FIG. 6. These storage modules 46*a-e* must be those that are emptied after the overflowing storage module 46*f* in the next sorting pass.

Figure 7:
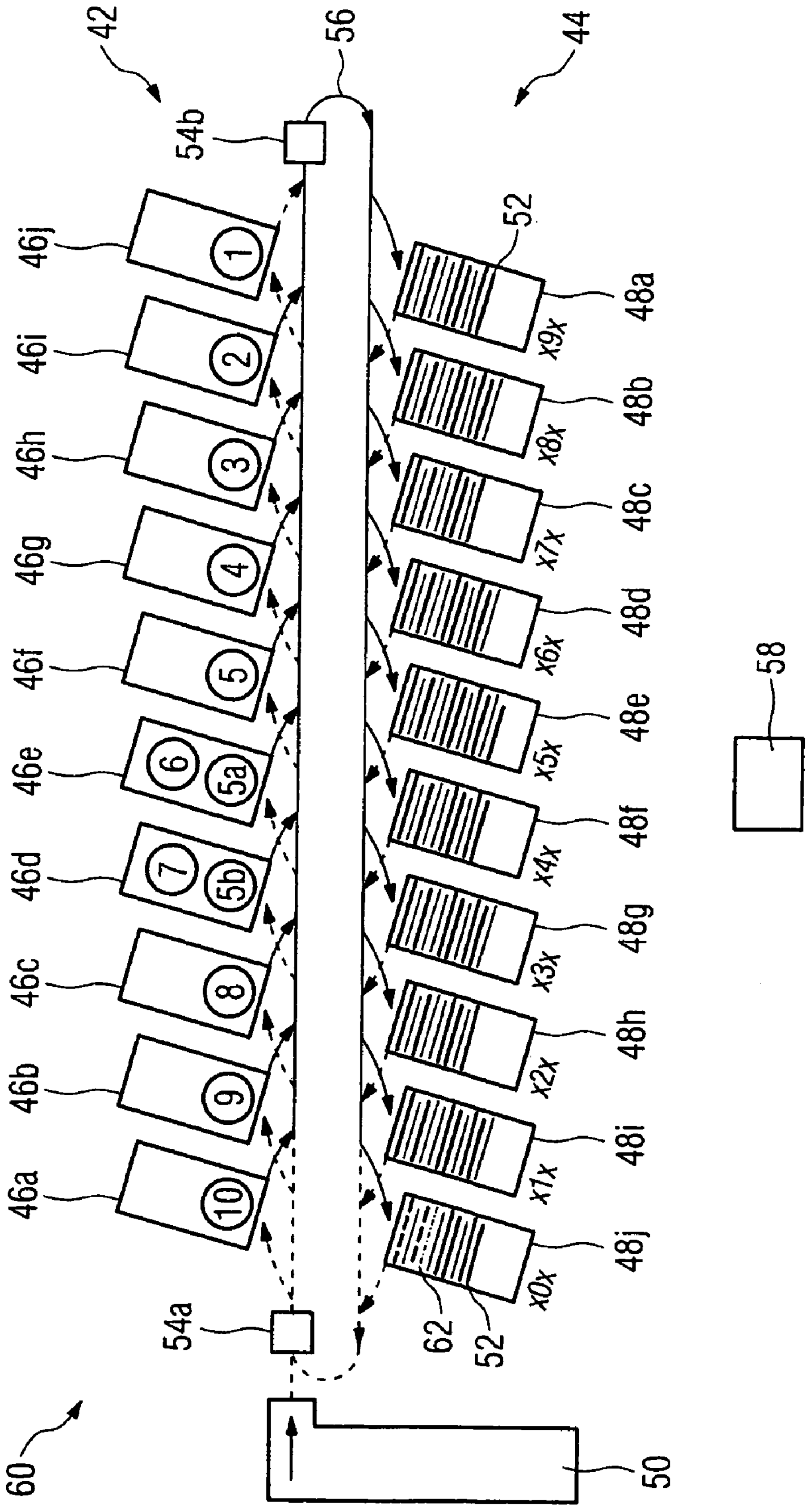
FIG. 7 is an illustration of the device from FIG. 5, in which mail items from the first segment have been sorted into the second segment.

The second sorting pass is shown schematically in FIG. 7. All the storage modules 46*a-j* are emptied in order, with the storage module 46*e* initially only being emptied to the extent that only overflow mail items are removed, after the storage module 46*f* has been emptied. The storage module 46*d* is then emptied immediately but only to the extent that only overflow mail items are removed. The storage module 46*e* is then emptied completely, then the storage module 46*d*, etc. In this way all the mail items 52 with a 5 as the last digit of their address are sorted one after the other into the second segment 44.

Figure 8:
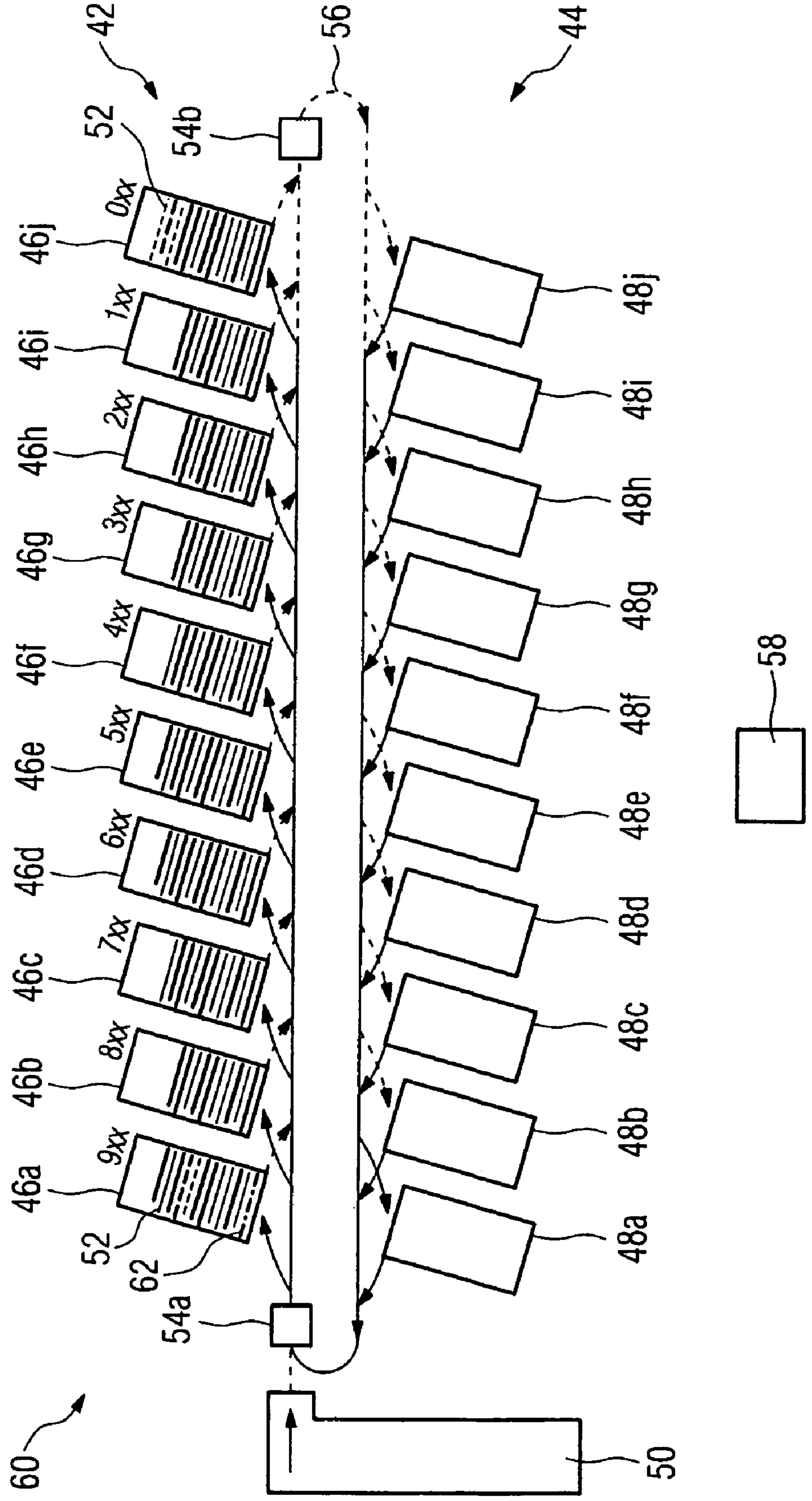
FIG. 8 is an illustration of the device from FIG. 5 after a third and last sorting pass.

After the third sorting pass, as shown in FIG. 8, all the unrecognized mail items 52 are at the head of all the mail items 52 in the storage module 46*j* and can be collected first and sorted manually by the delivery operator. The separator card 62 indicates the end of the region containing unrecognized mail items 52.

Figure 9:
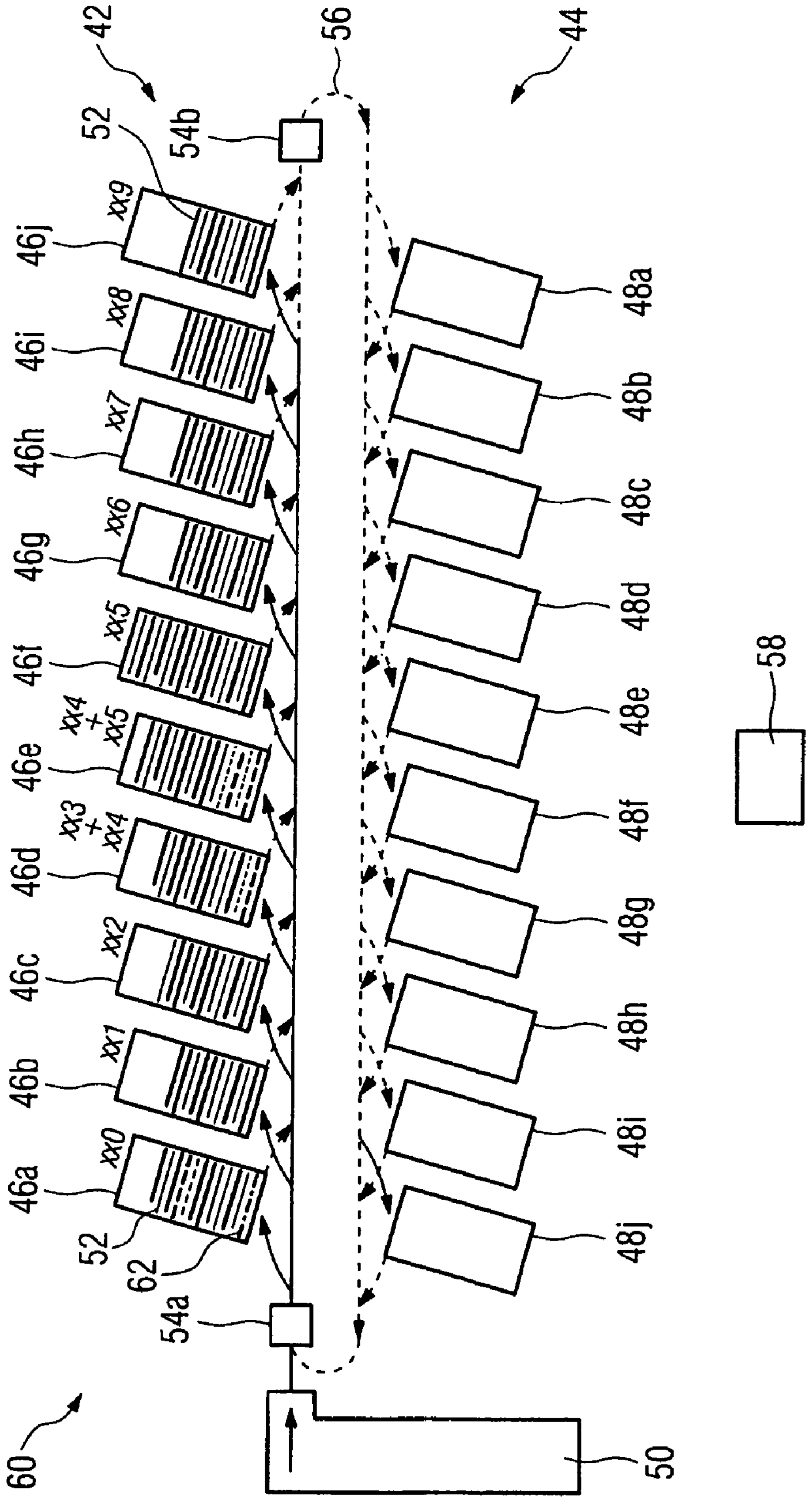
FIG. 9 is an illustration of the device from FIG. 5, in which overflow mail items have also been sorted into already occupied storage modules of the first segment in the first sorting pass.

A further sorting method is described below with reference to FIGS. 9 and 10, with the description which follows again being restricted essentially to the differences compared with the exemplary embodiment in FIGS. 5 to 8.

Overflow mail items remain in the first segment 42, so the second segment 44 remains free and can optionally be used for other processes. They are sorted into the next storage module 46*e* in emptying order, as shown by the broken lines. No further mail items 52 assigned originally to the storage module 46*e*, in other words having a 4 as the last digit of their address, can then be sorted into the storage module 46*e* which is occupied in a secondary manner. They are therefore sorted into the next storage module 46*d*, likewise shown by the broken lines. Again no further mail items 52 assigned originally to the storage module 46*d* can be sorted into it, so they are again sorted into the next storage module 46*c*, etc. Since when a compartment overflows, generally only a small proportion of mail items are still to be sorted, only relatively few mail items 52 are sorted in a secondary manner. If the downstream storage modules 46*a-e* for the next sorting pass are not sufficient, a storage module 48*a-j* of the second segment 44 can be used, before the last storage module 46*a* is reached.

Figure 10:
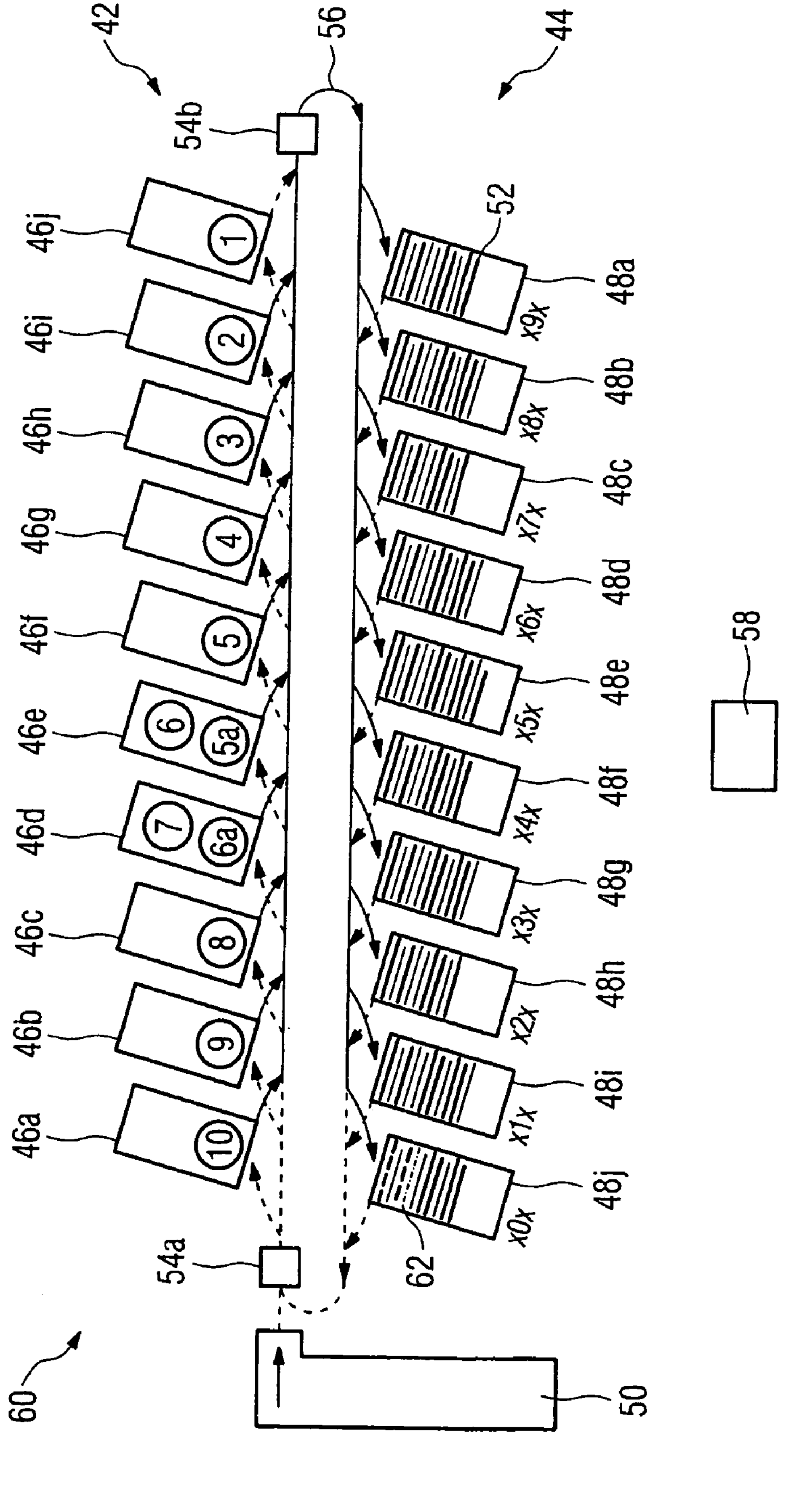
FIG. 10 is an illustration of the device from FIG. 9, in which mail items from the first segment have been sorted into the second segment.

In the next sorting pass the storage modules 46*a-j* are emptied, as shown in FIG. 10, so that the storage modules 46*a-j* are emptied in order. The unrecognized mail items 52 are again at the head of the overall sequence of all mail items 52.

The invention claimed is:

1. A device for sorting flat mail items, the device comprising:

a sorting device;

at least first and second segments, each of said first and second segments having at least N storage modules, each storage module configured to have an insertion mode where flat mail items are inserted into the storage module, and a withdrawal mode where flat mail items are withdrawn from the storage module;

a circulating conveyor for conveying mail items from said first segment to said second segment and from said second segment to said first segment; and a process device configured to control:

a first sorting pass in said first segment and a subsequent second sorting pass in said second segment;

a depositing of overflow mail items assigned to one of said storage modules that has been closed because it is full into another one of said storage modules in the first sorting pass, where the said another one of said storage modules is operated in the insertion mode;

a subsequent emptying of said another one of said storage modules with the overflow mail items, where said another one of said storage modules is operated in the withdrawal mode; and a subsequent inclusion of the overflow mail items in the sorting process of the second sorting pass.

2. A device for sorting flat mail items, the device comprising:

a sorting device;

at least first and second segments, each of said first and second segments having at least N storage modules, each storage module configured to be operated in an insertion mode where flat mail items are inserted into the storage module, and in a withdrawal mode where flat mail items are withdrawn from the storage module;

a circulating conveyor for conveying mail items from said first segment to said second segment and from said second segment to said first segment; and a process device configured to:

control a first sorting pass in said first segment and a subsequent second sorting pass in said second segment;

identify at least one storage module that has been closed because it is full and to deposit overflow mail items assigned to said at least one storage module that has been closed because it is full into another one of said storage modules in the first sorting pass, said another one of said storage modules being operated in the insertion mode;

control a subsequent emptying of said another one of said storage modules with the overflow mail items, where said another one of said storage module is operated in the withdrawal mode; and control a subsequent inclusion of the overflow mail items in the sorting process of the second sorting pass.

* * * * *